United States Patent
Singh et al.

(10) Patent No.: US 7,970,958 B2
(45) Date of Patent: Jun. 28, 2011

(54) PERIPHERAL INTERFACE ALERT MESSAGE FOR DOWNSTREAM DEVICE

(75) Inventors: Ajai K. Singh, Folsom, CA (US); David Puffer, Tempe, AZ (US)

(73) Assignee: Micron Technology, Inc., Boise, ID (US)

( * ) Notice: Subject to any disclaimer, the term of this patent is extended or adjusted under 35 U.S.C. 154(b) by 510 days.

(21) Appl. No.: 11/156,838

(22) Filed: Jun. 20, 2005

(65) Prior Publication Data
US 2006/0288098 A1    Dec. 21, 2006

(51) Int. Cl.
*G06F 3/00* (2006.01)
*G06F 11/00* (2006.01)

(52) U.S. Cl. .......... 710/19; 710/5; 710/15; 710/16; 710/17; 710/18; 710/55; 714/2; 714/48; 714/49; 714/50; 714/746; 714/758; 714/799; 709/224

(58) Field of Classification Search ........... 710/5, 15, 710/19, 8
See application file for complete search history.

(56) References Cited

U.S. PATENT DOCUMENTS

| | | | | |
|---|---|---|---|---|
| 3,749,845 A | * | 7/1973 | Fraser | 370/433 |
| RE31,319 E | * | 7/1983 | Fraser | 370/433 |
| 5,163,151 A | * | 11/1992 | Bronikowski et al. | 714/57 |
| 5,673,252 A | * | 9/1997 | Johnson et al. | 370/449 |
| 5,961,605 A | * | 10/1999 | Deng et al. | 709/234 |
| 6,181,704 B1 | * | 1/2001 | Drottar et al. | 370/410 |
| 6,272,550 B1 | * | 8/2001 | Deng et al. | 709/246 |
| 6,674,751 B1 | * | 1/2004 | Dittmar | 370/364 |
| 6,744,765 B1 | * | 6/2004 | Dearth et al. | 370/394 |
| 7,370,243 B1 | * | 5/2008 | Grohoski et al. | 714/48 |
| 2002/0142720 A1 | * | 10/2002 | Russell et al. | 455/41 |
| 2004/0059978 A1 | * | 3/2004 | Subrahmanya | 714/748 |
| 2005/0034045 A1 | * | 2/2005 | Lueck et al. | 714/746 |
| 2005/0120163 A1 | * | 6/2005 | Chou et al. | 711/103 |
| 2005/0207726 A1 | * | 9/2005 | Chen | 386/46 |
| 2006/0230210 A1 | * | 10/2006 | Stanton | 710/301 |
| 2006/0239095 A1 | * | 10/2006 | Shi et al. | 365/222 |
| 2006/0282603 A1 | * | 12/2006 | Onufryk et al. | 710/312 |
| 2006/0282639 A1 | * | 12/2006 | Liu et al. | 711/170 |
| 2007/0028152 A1 | * | 2/2007 | Mishra et al. | 714/52 |

OTHER PUBLICATIONS

PCI Express Base Specification Revision 1.0 Published Apr. 29, 2002. (p. 338-342).*
'PCI Express Architecture Advanced Protocols & Features' by Jasmin Ajanovic, copyright 2003, PCI-SIG.*

* cited by examiner

*Primary Examiner* — Henry W Tsai
*Assistant Examiner* — Steven G Snyder
(74) *Attorney, Agent, or Firm* — Blakely, Sokoloff, Taylor & Zafman LLP

(57) ABSTRACT

According to some embodiments, a message generated by a downstream device is received at upstream device. The message may, for example, be received via a peripheral interface and may not require a response. It may then be determined that an error is associated with the message, and an alert message may be sent from the upstream device to the downstream device via the peripheral interface.

20 Claims, 7 Drawing Sheets

PERIPHERAL INTERFACE ALERT MESSAGE FOR DOWNSTREAM DEVICE

BACKGROUND

A peripheral interface may be used to exchange information within an apparatus. For example, a Memory Controller Hub (MCH) in a Personal Computer (PC) might use a peripheral interface to exchange information with one or more Ethernet cards, communication devices, and/or storage units. In some cases, an error might occur during an exchange of information. For example, a message transmitted from an Ethernet card to a Memory Controller Hub may be unreadable.

DETAILED DESCRIPTION

Figure 1:
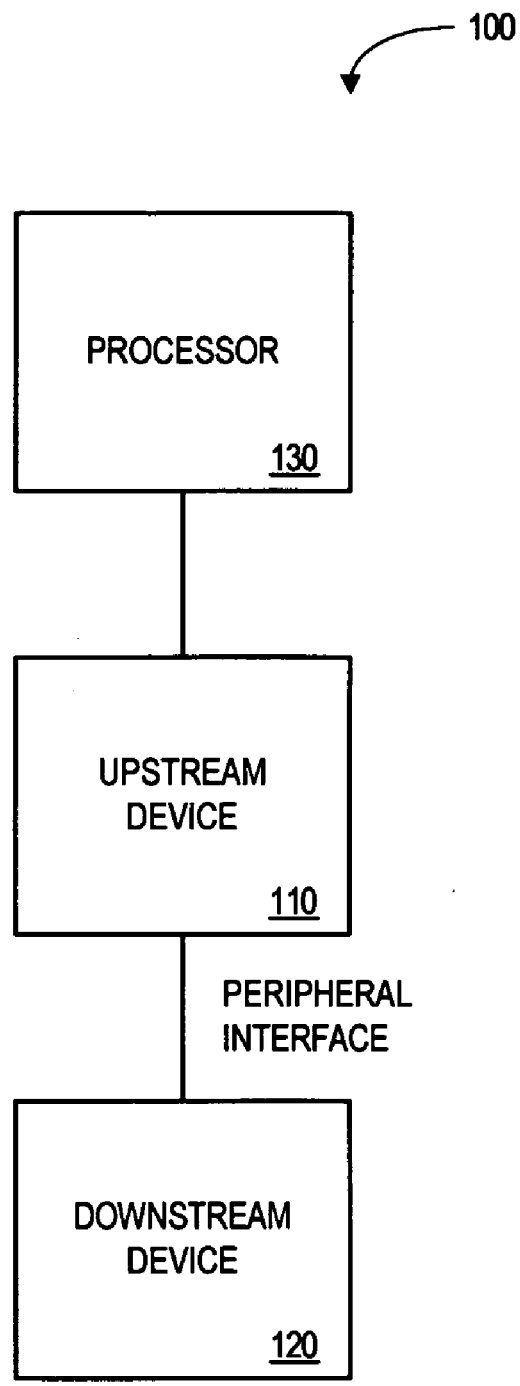
FIG. 1 is a block diagram of an apparatus according to some embodiments.

A peripheral interface may be used to exchange information within an apparatus. For example, FIG. 1 is a block diagram of an apparatus 100 wherein an "upstream" device 110 exchanges information with a "downstream" device 120 via a peripheral interface. As used herein the term "upstream" refers to devices that are closer to a processor 130 in a series of interfaced devices (closer in terms of communication as opposed to being physically closer), and the phrase "downstream" refers to devices that are further away from the processor 130 in the series. The processor might be a central processing unit of any type of architecture, such as an INTEL® PENTIUM IV® processor. Note that embodiments described herein may be associated with an apparatus that has multiple processors. Moreover, it should be appreciated that apparatus 100 may include other, additional, or fewer components than those illustrated in FIG. 1, without departing or altering the scope of the various embodiments herein.

The upstream device 110 might be, for example, a root complex adapted to communicate with the downstream device 120 via the peripheral interface and with the processor 130 via another interface (e.g., a system bus). Examples of upstream devices might include a chipset controller, MCH device, a Graphic MCH (GMCH) device, and a host bridge device. Note that the upstream device 110 might also communicate with other devices (e.g., with one or more memory units).

The downstream device 120 might be, for example, an "end point" or peripheral device. Examples of peripheral devices include an Ethernet card, a video card, a communication device, a storage unit (e.g., a disk controller), and/or a test device.

According to some embodiments, the peripheral interface comprises a relatively high-speed, low-pin-count, point-to-point interface having a multi-drop, parallel bus topology. The peripheral interface might be, for example, a link that operates in accordance with the Peripheral Component Interconnect (PCI) Special Interests Group (SIG) standard entitled "Peripheral Component Interconnect Express® Base Specification" (versions 1.0a or 1.1).

In some cases, an error may occur when the upstream device 110 and the downstream device 120 exchange information via the peripheral interface. For example, a message transmitted from the downstream device 120 to the upstream device 110 may be unreadable (e.g., because of noise on the link). In this case, it may be helpful to notify the downstream device 120 that an error has occurred. For example, the downstream device 120 might perform a re-set or otherwise try to correct the error. As another example, the downstream device 120 might output information about the error (e.g., to help someone who is trying to debug the error).

Figure 2:
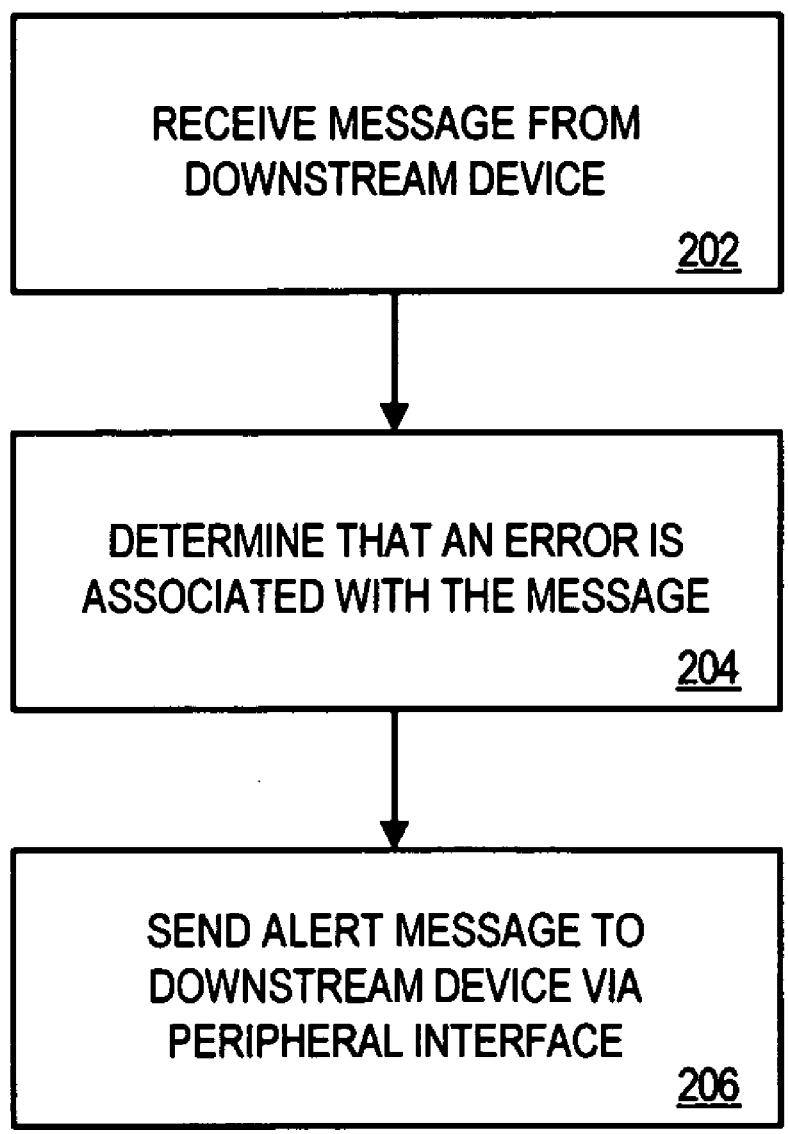
FIG. 2 is a flow diagram illustrating a method according to some embodiments.

FIG. 2 is a flow diagram illustrating a method according to some embodiments. The method may be performed, for example, by the upstream device 110 of FIG. 1. The flow charts described herein do not necessarily imply a fixed order to the actions, and embodiments may be performed in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein.

At 202, a message is received at an upstream device from a downstream device. For example, a PCI Express message might be received from a peripheral device via a peripheral interface. In some case, the PCI Express message is a "non-posted" message that requires a response. For example, a memory read request transmitted by the downstream device will require that the downstream device eventually receive a response to the request (e.g., including the data that was read). In other cases, a PCI message is a "posted" message that does not require a response. For example, a memory write request transmitted by the downstream device does not require any response. According to some embodiments, the message received at 202 does not require a response (e.g., is a "posted" PCI Express request).

At 204, it is determined that an error is associated with the message. For example, Cyclical Redundancy Check (CRC) data may be examined to determine if the message has been truncated or otherwise corrupted.

At 206, a new type of alert message is sent from the upstream device to the downstream device via the peripheral interface. Note that a message may be received from, or transmitted to, the downstream device via another device (e.g., a switch). Also note that, according to some embodiments, the alert message may be sent to the downstream device in addition to a completion to a non-posted PCI Express request. In this case, the completion might simply indicate that the request was not successful while the alert message may be used to provide additional details about the error.

Figure 3:
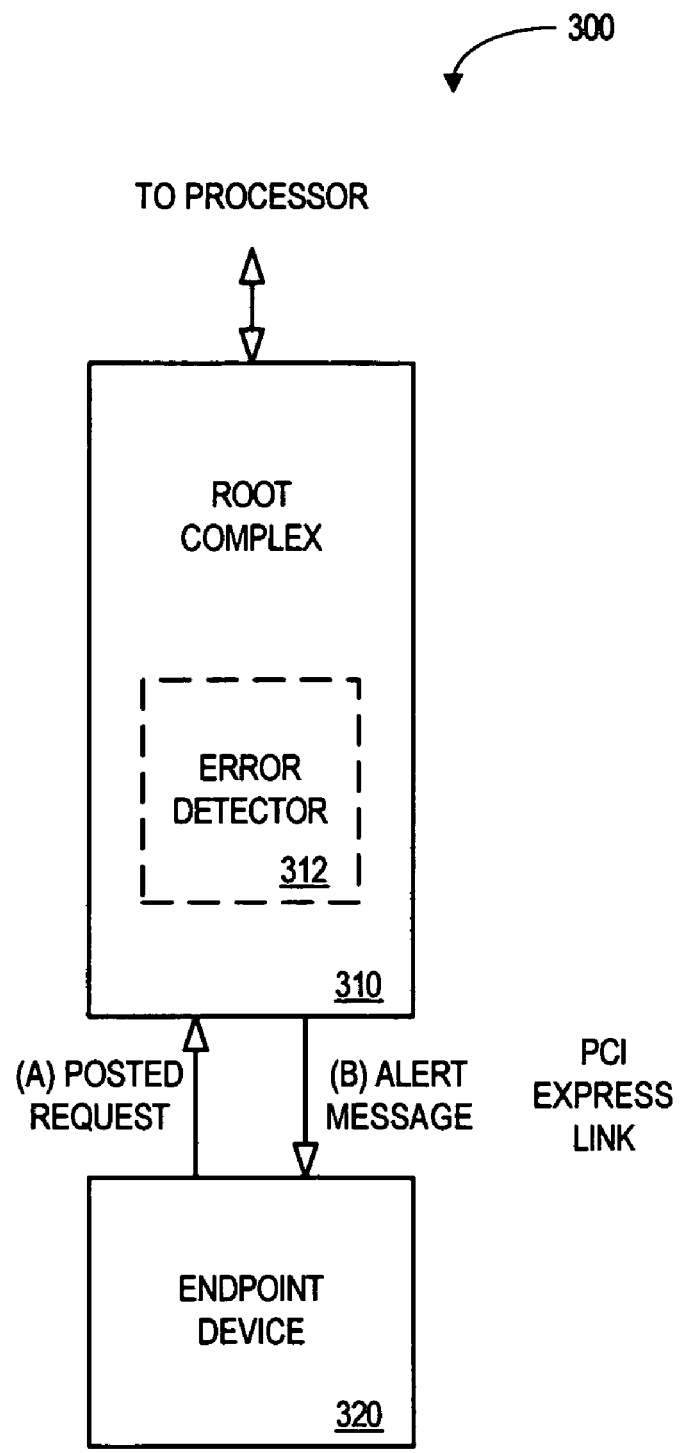
FIG. 3 is an information flow diagram according to some embodiments.

FIG. 3 is an information flow diagram 300 according to some embodiments. In particular, root complex 310 receives a posted request from an endpoint device 320 via a PCI Express link at (A). An error detector 312 at the root complex 310 may then determine that there is a problem with the posted request. The detected error might be, for example, a correctable, non-correctible fatal, or non-correctable non-fatal PCI Express error.

Figure 4:
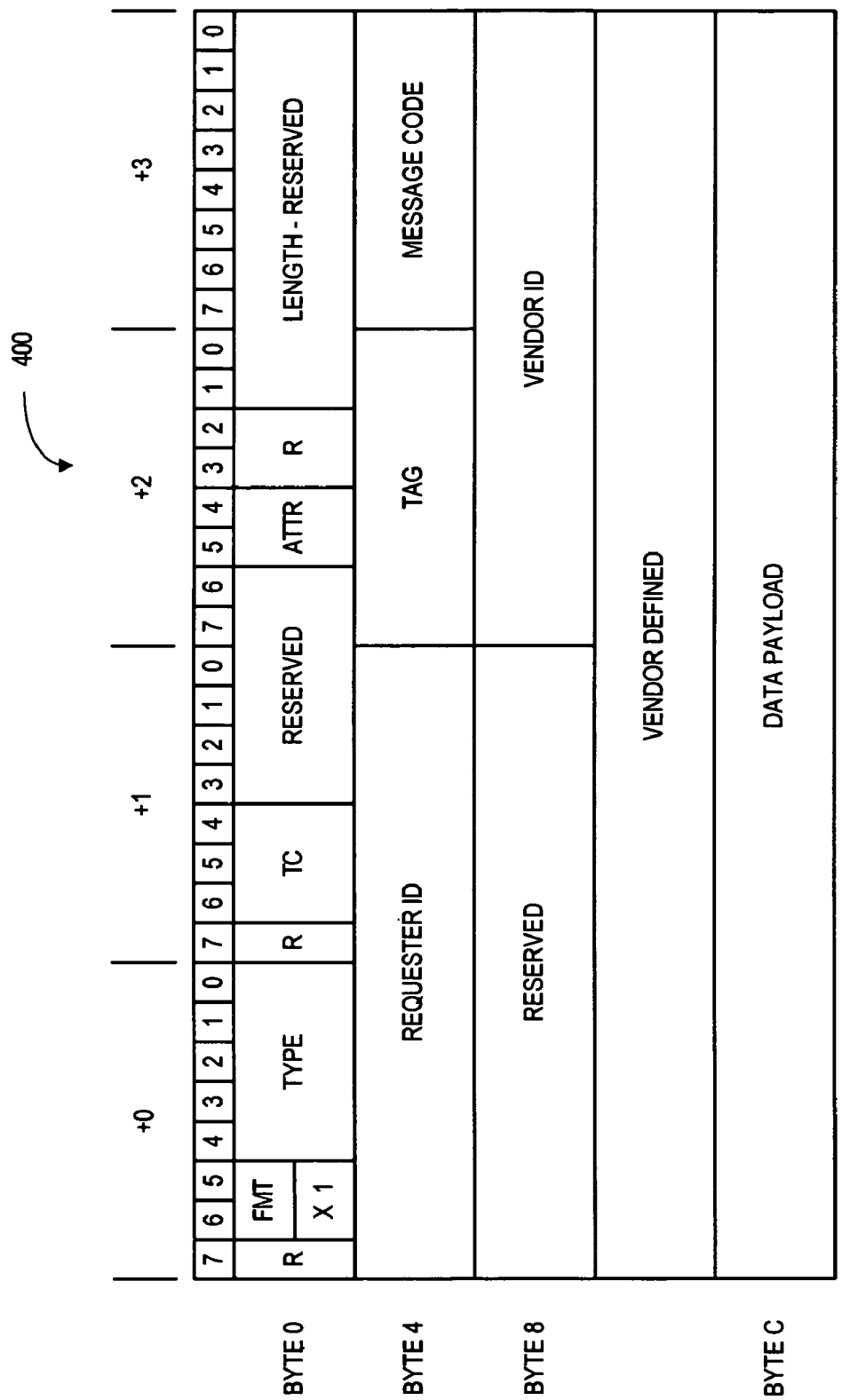
FIG. 4 illustrates an example of an alert message according to some embodiments.

In response to the detected error, the root complex 310 may send an alert message to the endpoint device 320 at (B). The alert message might comprise, for example, an alert Transaction Layer Packet (TLP). FIG. 4 illustrates an example of an alert message 400 according to some embodiments. In particular, the alert message 400 is a Vendor Defined Message Type-1 PCI Express packet. The message 400 might include, for example, format (FMT) information set to "11" and type (TYP) information set to "10011" indicating that the message is to be broadcast from a root complex. In addition, the message 400 may include traffic class (TC) information set to "0" and attribute (ATTR) information set to "00."

Requestor identifier (ID) information may indicate the downstream device associated with the detected error (e.g., and might include a bus number, a requester device number, and/or a function number). Tag information may be set to zero, and vendor identifier (ID) information might be associated with an entity that has defined the message 400. For example, the vendor ID might be set to "8086h" if the message 400 was defined by INTEL CORPORATION®.

The message 400 may further include vendor defined data, such as a unique identifier (for that particular vendor) indicating that the message 400 is an alert packet. The message 400 may also include a data payload containing information about the error. For example, the data payload might contain the sequence number of the last packet that was successfully processed by the root complex (e.g., prior to the error). The data payload might also contain data from an uncorrectable or correctable status register (e.g., as set forth in the PCI specification).

Note that PCI Express lets an endpoint device drop Vendor Defined Message Type-1 packets if desired. As a result, the alert message 400 should not cause problems for endpoint devices that do not support the message.

Figure 5:
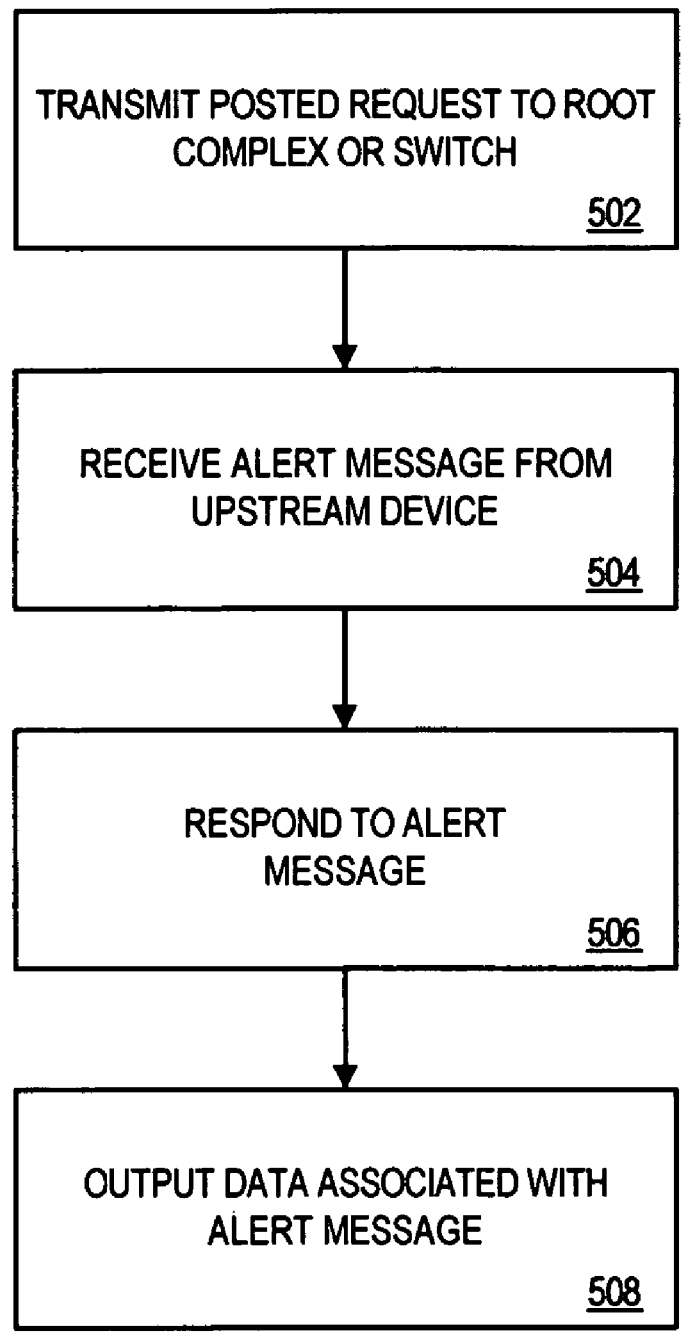
FIG. 5 is a flow diagram illustrating a method according to some embodiments.

FIG. 5 is a flow diagram illustrating a method according to some embodiments. The method might be performed, for example, by the downstream device 120 of FIG. 1 or the endpoint device 320 of FIG. 3. At 502, a posted request is transmitted upstream to a root complex or switch. The posted request might comprise, for example, a memory write request.

At 504, an alert message is received from an upstream device. For example, a PCI Express Vendor Defined Message Type-1 packet might be received with a vendor ID and vendor defined data indicating that the packet is an alert packet. The downstream device might try to respond to the alert message at 506. For example, the downstream device might re-set itself or otherwise attempt to recover from a bad state.

At 508, the downstream device might log and/or output data associated with the alert message. For example, the downstream device might output data associated with the last packet successfully processed by the root complex along with data from an uncorrectable error status register. Note that someone trying to debug an error might be interested in determining when the error occurred and/or other details about the error. Although a logic analyzer could be coupled to various interfaces (e.g., a system bus) to determine this type of information, such an approach can be difficult and time consuming (especially when the apparatus is associated with a mobile platform). According to some embodiments, the downstream device can directly output information associated with an error to facilitate a debugging process.

Figure 6:
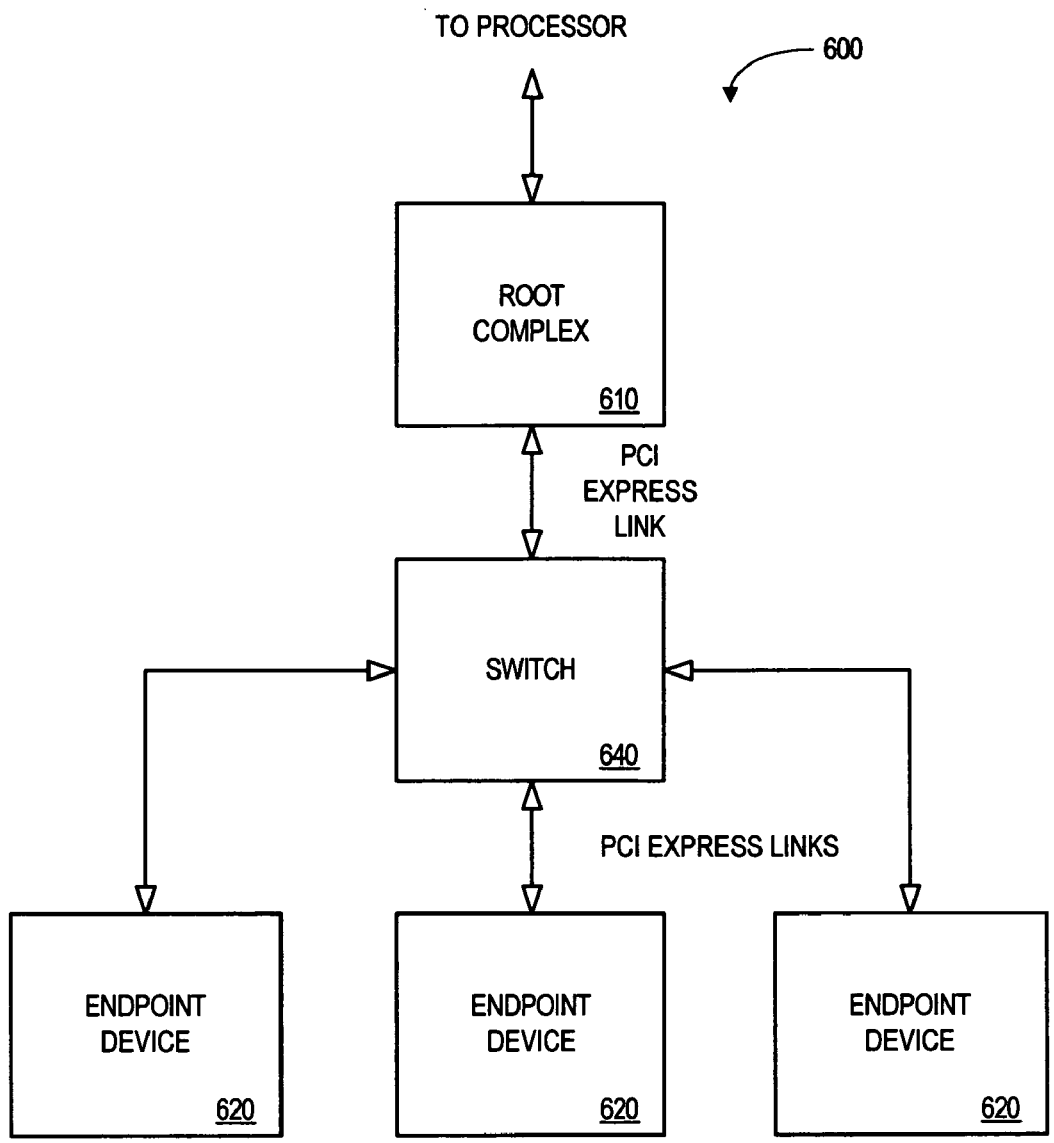
FIG. 6 is a block diagram of an apparatus according to some embodiments.

Note that an alert message might be transmitted downstream (i) from a device other than a root complex, and/or (ii) to a device other than an endpoint. For example, FIG. 6 is a block diagram of an apparatus 600 according to some embodiments. In this case, a switch 640 is coupled to a root complex 610 and a number of different endpoint devices 620 via a plurality of PCI Express links. In this case, an endpoint device 620 might send a posted request to the switch 640, which in turn forwards the request to the root complex 610. According to some embodiments, the switch 640 may detect an error and send an alert message to the appropriate endpoint device 620. According to other embodiments, the root complex 610 will detect an error and send an alert message to the switch 640 (which in turn may forward the alert message to the appropriate endpoint device 620).

Figure 7:
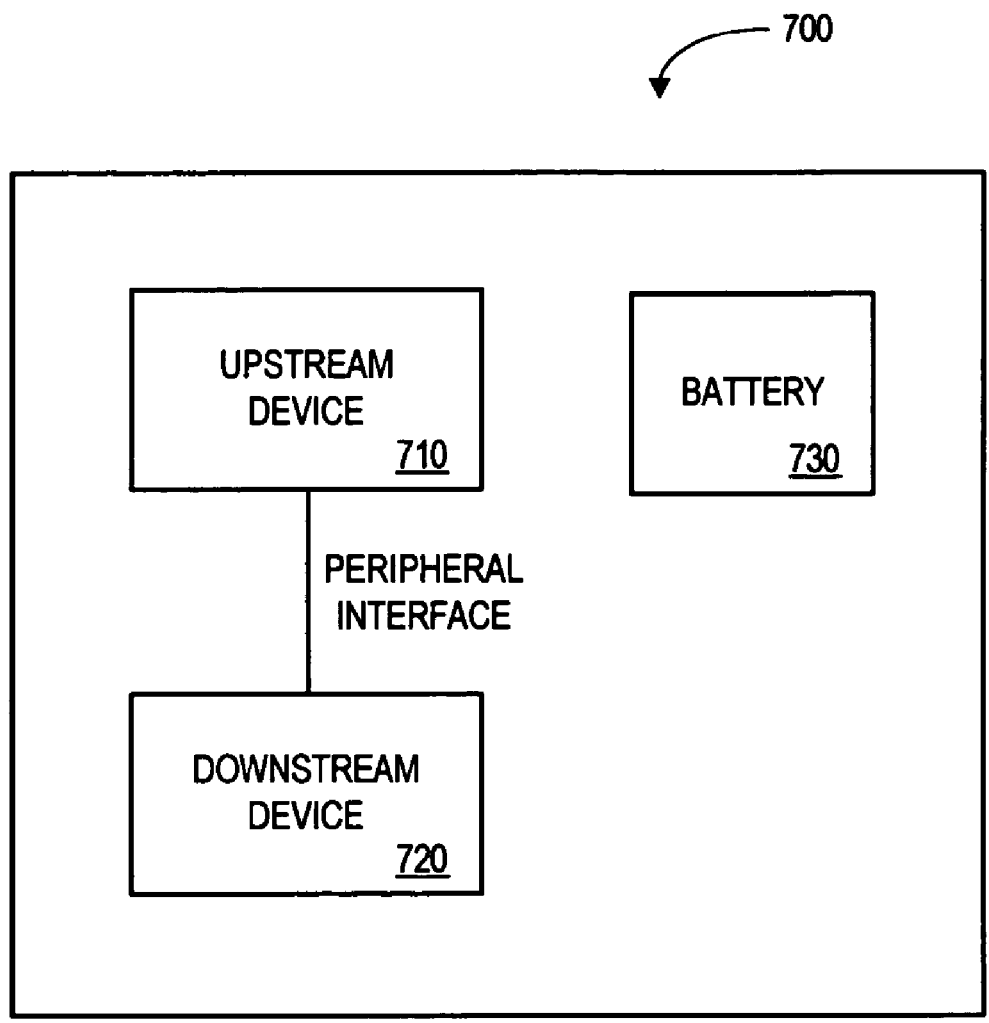
FIG. 7 is a block diagram of a system according to some embodiments.

FIG. 7 is a block diagram of a system 700 according to some embodiments. The system 700 might be associated with, for example, a PC, a mobile computer, a server, a wireless device, a game device, or a media device (e.g., a Digital Video Recorder (DVR) or set-top box).

The system 700 may include an upstream device 710 and a downstream device 720 in accordance with any of the embodiments described herein. For example, the upstream device 710 may be an interface device (e.g., a root complex or switch) adapted to detect an error associated with a request, and to transmit an alert message to the downstream device 720 via a peripheral interface. The downstream device 720 might comprise, for example, an endpoint device (e.g., a peripheral) adapted to receive the alert message. According to some embodiments, the system 700 further includes a battery 730 (e.g., to provide power to a processor and/or to provide power when the system 700 is turned off).

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

For example, although some embodiments have been described with respect to a PCI Express interface, note that embodiments may be associated with other types of interfaces, including other types of PCI interfaces and non-PCI interfaces. Moreover, although a particular alert message format was described with respect to FIG. 4, other formats may be used (e.g., additional information about an error could be provided in an alert message).

The several embodiments described herein are solely for the purpose of illustration. Persons skilled in the art will recognize from this description other embodiments may be practiced with modifications and alterations limited only by the claims.

What is claimed is:

1. A method comprising:
receiving at an upstream device a message generated by a downstream device, wherein the message is received via a peripheral interface and does not require a response;
determining that the message is corrupted by an error;
upon determining that the received message is corrupted, sending an alert message from the upstream device to the downstream device via the peripheral interface, wherein the peripheral interface is associated with a Peripheral Component Interconnect (PCI) Express bus, and wherein the alert message includes:
a sequence number of the last packet to have been successfully processed by the upstream device prior to the error,
information associated with an uncorrectable error status register, and
a PCI Express vendor-defined message type-1 packet;

sending a completion message from the upstream device to the downstream device to indicate that the message was not successful in addition to sending the alert message; and directly outputting, by the downstream device, debug information associated with the error for debugging the error.

2. The method of claim 1, wherein the upstream device is to communicate with (i) the downstream device via the peripheral interface and (ii) a processor via another interface.

3. The method of claim 1, wherein the upstream device is associated with at least one of: (i) a root complex, (ii) a memory controller hub, (iii) a graphics memory controller hub, (iv) a chipset, or (v) a switch.

4. The method of claim 1, wherein the received message is associated with a PCI Express posted request.

5. The method of claim 1, wherein the determined error comprises at least one of: (i) a correctable PCI Express error, (ii) a non-correctible fatal PCI Express error, or (iii) a non-correctable non-fatal PCI Express error.

6. The method of claim 1, further comprising:
receiving the alert message at the downstream device, wherein the downstream device generates the debug information in response to receiving the alert message.

7. The method of claim 6, further comprising:
responding to the alert message at the downstream device, wherein responding further comprises the downstream device re-setting itself.

8. An apparatus including:
an input port to receive a request from a downstream peripheral, wherein the request does not require a response, and wherein the apparatus is to be coupled to the downstream peripheral via an interface, wherein the interface is associated with a Peripheral Component Interconnect (PCI) Express bus;
an error detector to detect that the received request is corrupted by an error during transmission of the request from the downstream peripheral; and
an output port to send a completion message in addition to an alert message to the downstream peripheral via the interface, wherein the alert message is sent upon the detecting that the received request is corrupted, wherein the completion message indicates that the request was not successful, wherein the downstream device directly outputs information associated with the error for debugging the error, and wherein the alert message includes:
a sequence number of the last packet to have been successfully processed by the apparatus prior to the error,
data associated with an uncorrectable error status register,
a PCI Express vendor-defined message type-1 packet.

9. The apparatus of claim 8, wherein the request is associated with a Peripheral Component Interconnect (PCI) Express posted transaction.

10. An apparatus comprising:
a storage medium having stored thereon instructions that when executed by a machine result in the following:
detecting, at a root complex, that a message received from an endpoint device is corrupted by an error, wherein the root complex is to:
communicate with the endpoint device via a peripheral interface, wherein the peripheral interface is associated with a Peripheral Component Interconnect (PCI) Express bus, and
communicate with a processor via another interface;

upon detecting that the received message is corrupted, transmitting an alert message to the endpoint device via the peripheral interface, wherein the alert message includes:
a sequence number of the last message to have been successfully processed by the root complex prior to the error,
information associated with an uncorrectable error status register, and
a PCI Express vendor-defined message type-1 packet;
sending a completion message to the endpoint device to indicate that the message was not successful in addition to sending the alert message; and
directly outputting, by the endpoint device, information associated with the error for debugging the error.

11. A system comprising:
an endpoint adapted to transmit a request via a peripheral interface;
an interface device coupled to the peripheral interface to receive the request, to detect that the request is corrupted by an error, and upon detecting the request is corrupted, to transmit an alert message to the endpoint via the peripheral interface, wherein the peripheral interface is associated with a Peripheral Component Interconnect (PCI) Express bus, wherein the interface device sends a completion message to indicate that the request was not successful in addition to sending the alert message, wherein the alert message includes:
a sequence number of the last packet to have been successfully processed by the interface device prior to the error,
information associated with an uncorrectable error status register,
a PCI Express vendor-defined message type-1 packet; and
a battery to provide power to the endpoint and the interface when the system is turned off,
wherein the endpoint device is configured to directly output information associated with the error for debugging the error.

12. The system of claim 11, wherein the system is associated with at least one of: (i) a personal computer, (ii) a mobile computer, (iii) a server, (iv) a wireless device, (v) a game device, or (vi) a media device.

13. The method of claim 1, wherein the determining further comprises determining the error occurred during transmission of the message from the downstream device.

14. The method of claim 1, wherein the alert message information comprises requester identifier information including at least one of a bus number, a requester device number or a function number indicative of the downstream device associated with the message determined to be corrupted.

15. The method of claim 1, wherein the alert message information comprises an identifier indicating the alert message to be an alert message.

16. The apparatus of claim 8, wherein the apparatus is to be coupled to a processor via a second interface separate from the interface coupling the apparatus to the downstream peripheral.

17. The apparatus of claim 8, wherein the alert message information comprises requester identifier information including at least one of a bus number, a requester device number or a function number indicative of the downstream device associated with the message determined to be corrupted.

18. The apparatus of claim 8, wherein the alert message information comprises an identifier indicating the alert message to be an alert message.

19. The system of claim 11, wherein the interface device is further coupled to a processor via a second interface separate from the peripheral interface.

20. The system of claim 11, wherein the alert message information comprises requester identifier information including at least one of a bus number, a requester device number or a function number indicative of the downstream device associated with the message determined to be corrupted.

* * * * *

UNITED STATES PATENT AND TRADEMARK OFFICE
CERTIFICATE OF CORRECTION

PATENT NO. : 7,970,958 B2  
APPLICATION NO. : 11/156838  
DATED : June 28, 2011  
INVENTOR(S) : Ajai K. Singh et al.

Page 1 of 1

It is certified that error appears in the above-identified patent and that said Letters Patent is hereby corrected as shown below:

In column 5, line 51, in Claim 8, delete "register," and insert -- register, and --, therefor.

In column 6, line 34, in Claim 11, delete "register," and insert -- register, and --, therefor.

Signed and Sealed this
Sixteenth Day of August, 2011

David J. Kappos
*Director of the United States Patent and Trademark Office*